March 18, 1958 — R. T. LAMIELLE — 2,826,966
MILLING MACHINE ATTACHMENT
Filed Sept. 21, 1956

INVENTOR.
Robert T. Lamielle
BY
Frease & Bishop
ATTORNEYS

United States Patent Office 2,826,966
Patented Mar. 18, 1958

2,826,966

MILLING MACHINE ATTACHMENT

Robert T. Lamielle, East Canton, Ohio

Application September 21, 1956, Serial No. 611,315

4 Claims. (Cl. 90—62)

The invention relates to an attachment for hydraulically operated milling machines or die sinking machines and more particularly to a three-dimensional tracer attachment.

The type of machine to which the attachment is applicable is controlled hydraulically to move the cutting tool by means of a tracing pattern or template in any direction, angle or contour. Such machines are provided with a hydraulic depth control unit and with a 360° automatic profiling unit.

Under present practice two templates or patterns are necessary, one for the depth control and the other for the 360° profile unit. Otherwise only one automatic operation can be performed at one time upon this machine.

The present invention contemplates the provision of an attachment adapted to be connected to both the depth control unit and to the 360° profiling unit so that both of these controls may be used on one template or pattern at the same time automatically.

It is therefore an object of the invention to provide an improved tracer attachment for simultaneous three-direction control between a tool and workpiece in template or pattern-controlled machines.

Another object is to provide a simple and easily connected attachment for connecting both the depth control unit and the 360° profiling unit of a hydraulic milling machine or die sinking machine to a single tracer.

The above and other objects, apparent from the drawing and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawing, in which.

Figure 1:
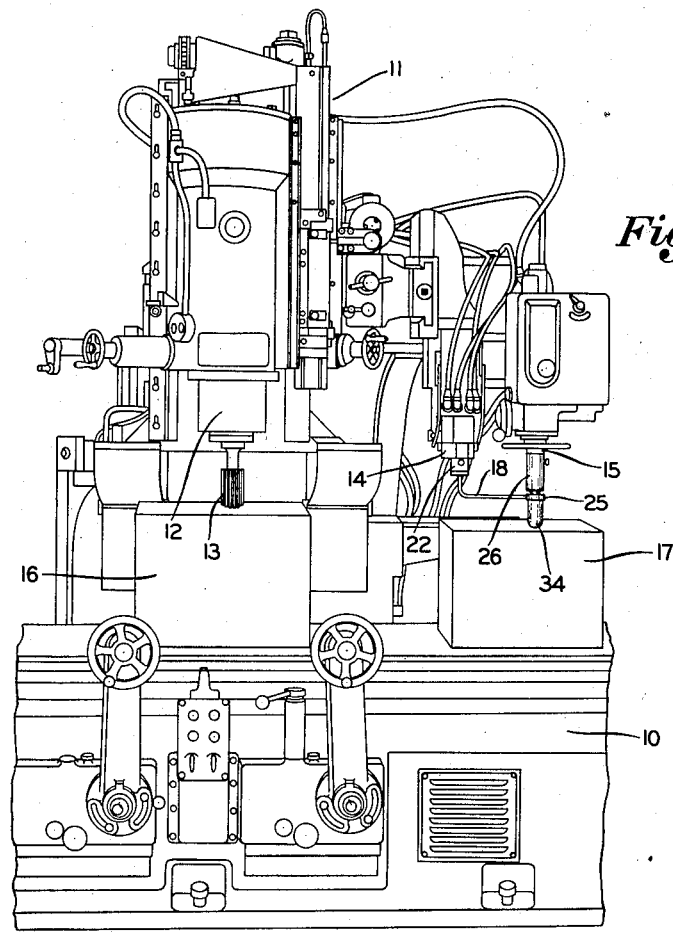
Fig. 1 is a front elevation of a hydraulic milling machine or die sinking machine provided with hydraulic depth control unit and 360° profiling unit, showing attachment to which the invention pertains connected thereto.

The type of machine shown in Fig. 1 is a hydraulically operated milling machine or die sinking machine which is controlled hydraulically to move a cutting tool by tracing patterns or templates.

A hydraulic depth control unit upon the machine operates vertically to trace the depth of die cavities or the like in a pattern or template, in order to produce a vertical movement of the cutting tool, and a 360° profiling unit upon the machine adapted to move horizontally in any direction to trace the profile of a similar template or pattern.

The machine includes generally a table 10, turret 11, spindle 12 for the milling tool 13, hydraulic depth control unit 14 and 360° automatic profiling unit 15. The workpiece indicated at 16 is placed upon the table 10 beneath the cutting tool 13.

In the normal operation of the machine, a tip or tracer attached to the depth control unit 14 is moved vertically over a die cavity or the like in a template or pattern associated therewith for controlling vertical movement of the cutting tool 13.

A tip or tracer connected to the 360° profiling unit 15 is moved horizontally over the contour of a similar template or pattern to control the movement of the cutting tool 13 relative to the workpiece 16. Thus in normal operation of this type of machine either two templates are necessary or only one automatic operation can be performed at a time.

The present invention comprises a tracer attachment adapted to be connected to both the depth control unit and the 360° profiling unit of the machine, the tracer attachment being adapted for three-directional movement of a single template or pattern 17, so as to correspondingly control movement of the cutting tool 13 over the workpiece 16.

This eliminates one template and allows reduction of hand-operated control and clearly reduces the amount of cutting time by permitting the tracer attachment to follow a template with irregular shapes and depths at one time.

Figure 3:
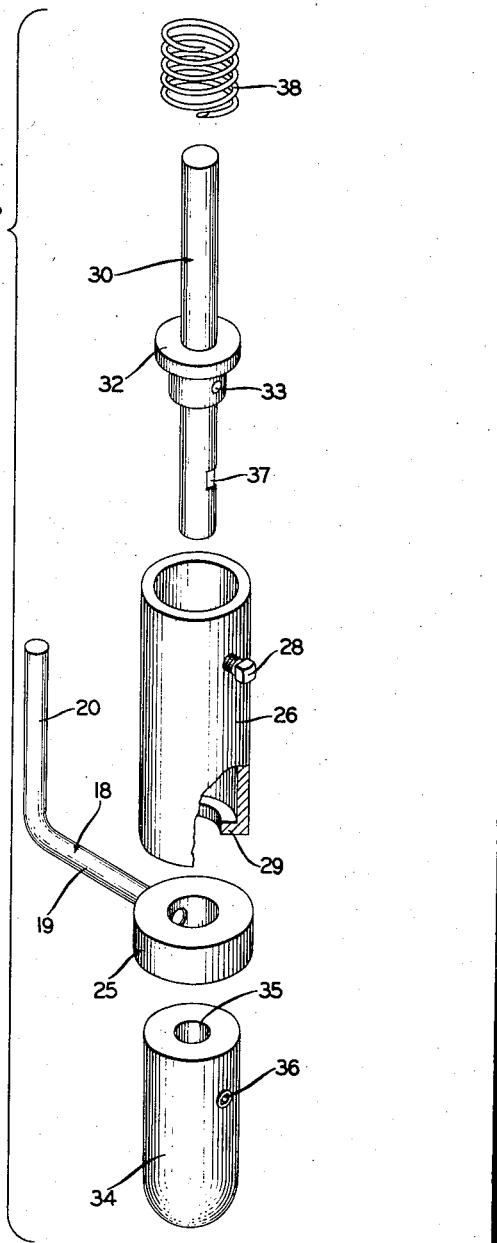
Fig. 3 is an exploded perspective view of the attachment.
Figure 2:
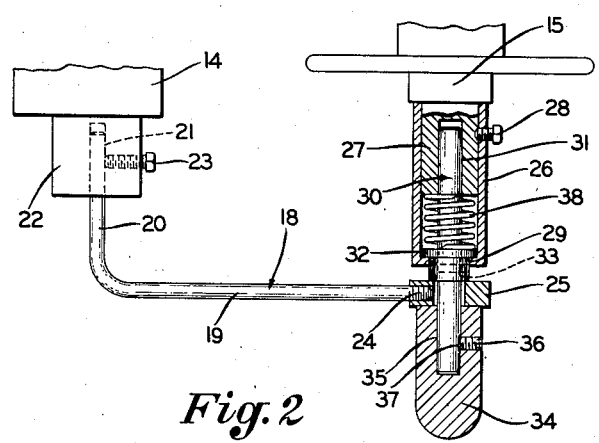
Fig. 2 is an enlarged, sectional elevation of the attachment showing the manner of connecting the same to both the depth control unit and the 360° profiling unit of the machine.

The attachment is shown in detail in Figs. 2 and 3 and includes the operating rod 18 of substantially L-shape comprising the relatively long horizontal arm 19 and the relatively short vertical arm 20. The vertical arm 20 is adapted to be inserted into the central bore 21 of the depending head 22 of the depth control unit 14. A set screw 23 in the depth control head 22 retains the upper portion of the arm 20 of the operating rod in said head.

The end of the horizontal arm 19 of the operating rod is screw threaded as at 24 and screwed into the annular yoke 25. The sleeve 26 slips over the cylindrical head 27 of the 360° profiling unit 15 and is attached thereto as by the set screw 28.

As will be clearly shown in Fig. 2, the sleeve 26 is of considerably greater length than the head 27, so that the lower end of the sleeve protrudes considerably below the lower end of the head. An inturned annular flange 29 is formed at the lower end of the sleeve 26.

The tracer stem, as indicated generally at 30, is in the form of a vertically disposed rod, the upper end of which is slidably received within the central bore 31 in the head 27 of the 360° profiling unit.

A collar 32 is fixed upon an intermediate portion of the stem 30 by any usual and well known means, such as the dowel pin 33, or this collar may be fixed upon the stem by any other usual and well known means such as welding, drive fit or the like.

The collar 32 is adapted to be normally pushed into engagement with the annular flange 29 at the bottom of the sleeve 26, by means of the coil spring 38 which surrounds the stem 30 within the sleeve 26 and is interposed between the collar 32 and the lower end of the head 27 as shown in Fig. 2.

The lower end portion of the stem 30, below the collar 32, is located through the yoke 25, and the tracer 34 is attached thereto. The tracer 34 is provided in its upper end with the central bore 35 which receives the lower end portion of the stem 30. A set screw 36 is threaded radially through one side of the tracer 34 and engages the flat portion 37 of the stem 30 holding the tracer thereon.

When the improved attachment is connected to the depth control unit and to the 360° profiling unit of the machine, in the manner shown in Figs. 1 and 2, the two units are thus both connected to the tracer 34.

Thus, as the tracer 34 is moved vertically or horizontally in any direction over the contour of the pattern or template 17, the cutting tool 13 is correspondingly moved relative to the workpiece 16, so as to cut the desired configuration therein.

It will thus be evident that in a single operation the single tracer joining the depth control unit and the 360° profiling unit, may be moved over the contour of a single pattern or template to control the cutting tool to cut the desired configuration upon the workpiece.

Obviously, this is a considerable advantage and improvement over the conventional manner of operating such machines, in which a separate tracer is attached to each of the units, whereby two templates or patterns are required, or only one automatic operation can be performed at a time, either a depth control operation or a profiling operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:
1. A tracer attachment for use upon a milling machine, said tracer attachment comprising a vertically movable stem, a tracer on the lower end of said stem, an operating rod located perpendicular to said stem, and a yoke upon the operating rod located around said stem.

2. A tracer attachment for use upon a milling machine, said tracer attachment comprising a vertically movable stem, a tracer on the lower end of said stem, an L-shape operating rod having a vertical arm and a horizontal arm, and a yoke upon said horizontal arm located around said stem.

3. A tracer attachment for use upon a milling machine, said tracer attachment comprising a vertical sleeve, an inturned annular flange at the lower end of said sleeve, a vertically movable stem within said sleeve, a collar fixed midway upon said stem and located within said sleeve, a spring located around the stem within the sleeve for urging said collar toward said annular flange, a tracer upon the lower end of the stem, an operating rod perpendicular to the stem and a yoke upon the operating rod located around said stem between said inturned annular flange and the tracer.

4. A tracer attachment for use upon a milling machine, said tracer attachment comprising a vertical sleeve, an inturned annular flange at the lower end of said sleeve, a vertically movable stem within said sleeve, a collar fixed midway upon said stem and located within said sleeve, a spring located around the stem within the sleeve for urging said collar toward said annular flange, a tracer upon the lower end of the stem, an L-shape operating rod having a vertical arm and a horizontal arm, and a yoke upon the horizontal arm located around said stem between said inturned annular flange and the tracer.

References Cited in the file of this patent
UNITED STATES PATENTS

| | | |
|---|---|---|
| 2,752,827 | Ernst | July 3, 1956 |
| 2,753,145 | Rosebrook | July 3, 1956 |